United States Patent [19]

Ishikuro et al.

[11] Patent Number: 4,812,330
[45] Date of Patent: Mar. 14, 1989

[54] PROCESS FOR PRODUCING A MAGNETIC RECORDING MEDIUM

[75] Inventors: Tadashi Ishikuro; Masaaki Fujiyama, both of Kanagawa, Japan

[73] Assignee: Fuji Photo Film Co., Ltd., Kanagawa, Japan

[21] Appl. No.: 188,942

[22] Filed: May 2, 1988

[30] Foreign Application Priority Data

Apr. 30, 1987 [JP] Japan .................. 62-104492

[51] Int. Cl.$^4$ .............................. H01F 10/02
[52] U.S. Cl. ...................... 427/128; 428/900
[58] Field of Search ................... 427/128–132, 427/48; 428/694, 900

[56] References Cited

U.S. PATENT DOCUMENTS 3,687,725 8/1972 Hartmann et al. ................ 117/235

Primary Examiner—Bernard Pianalto
Attorney, Agent, or Firm—Sughrue, Mion, Zinn, Macpeak & Seas

[57] ABSTRACT

A process for producing a magnetic recording medium is disclosed, which comprises uniformly dispersing an $\alpha$-$Al_2O_3$ powder having a particle size of not greater than 0.1 $\mu$m in a dispersion medium to obtain a dispersion, adding the dispersion to a coating composition for a magnetic layer essentially comprising a binder and a ferromagnetic powder having a specific surface area of not less than about 40 $m^2/g$, further dispersing the mixture to prepare a coating composition for a magnetic layer, and coating the resulting coating composition on a nonmagnetic support to obtain a magnetic layer having a dry thickness of about 2 $\mu$m or less. The resulting magnetic recording medium exhibits excellent electromagnetic characteristics and improved abrasion resistance.

10 Claims, No Drawings

PROCESS FOR PRODUCING A MAGNETIC RECORDING MEDIUM

FIELD OF THE INVENTION

This invention relates to a process for producing a magnetic recording medium, and more particularly, to a process for producing a magnetic recording medium whose magnetic layer exhibits excellent electromagnetic characteristics in the short wavelength region and improved abrasion resistance. The magnetic recording medium of this invention is suitable for use in various magnetic tapes, magnetic floppy discs, etc.

BACKGROUND OF THE INVENTION

Various magnetic recording media, such as audio tapes, video tapes and computer tapes, are generally subject to gradual wear due to violent sliding contact between a magnetic layer and a magnetic head upon recording or reproduction on a magnetic recording (reproduction) device. Therefore, it is desirable that the magnetic layer should have wear resistance to the sliding contact for a period of time as long as possible, i.e., have high abrasion resistance.

In order to impart high abrasion resistance to a magnetic layer essentially composed of a binder having uniformly dispersed therein a ferromagnetic powder, it has been proposed in Japanese patent application (OPI) No. 29932/85 (the term "OPI" as used herein refers to a "published unexamined Japanese patent application") to incorporate into a magnetic layer a nonmagnetic powder having a much higher hardness than the ferromagnetic powder, e.g., $Cr_2O_3$, $Al_2O_3$ and Sic, and having a particle size of from 0.3 to 0.4 $\mu$m as an abrasive. However, such a nonmagnetic powder cannot be dispersed uniformly in a composition for forming a magnetic layer (hereinafter referred to as magnetic composition), but forms a magnetic layer with uneven magnetic characteristics attributed to nonuniformity of the coating composition.

For the purpose of overcoming this problem, addition of a dispersing agent, such as stearic acid, lecithin, higher alcohols having 10 or more carbon atoms, etc., to the composition has been proposed to improve dispersibility of the nonmagnetic powder as described in U.S. Pat. No. 4,719,121, Japanese patent publication No. 48297/87 and Japanese patent application (OPI) No. 214519/87. This technique still fails to achieve sufficient dispersibility as expected, rather resulting in reduction of surface smoothness or electromagnetic conversion characteristics of the magnetic layer.

SUMMARY OF THE INVENTION

One object of this invention is to provide a process for producing a magnetic recording medium whose magnetic layer exhibits excellent electromagnetic characteristics and improved abrasion resistance.

It has now been discovered that these and other objects of the present invention are attained by a process for producing a magnetic recording medium which comprises uniformly dispersing an $\alpha$—$Al_2O_3$ powder having a particle size of not greater than 0.1 $\mu$m in a dispersion medium to obtain a dispersion, adding the dispersion to a coating composition for a magnetic layer essentially comprising a binder and a ferromagnetic powder having a specific surface area of not less than about 40 $m^2/g$, further dispersing the mixture to prepare a coating composition, and coating the resulting coating composition on a nonmagnetic support to obtain a magnetic layer having a dry thickness of not more than 2 $\mu$m.

DETAILED DESCRIPTION OF THE INVENTION

The magnetic recording medium according to the present invention essentially comprises a nonmagnetic support having thereon a magnetic recording layer ("a magnetic layer"). The magnetic layer essentially comprises a binder having dispersed therein a powder of a ferromagnetic substance.

The ferromagnetic substance includes $\gamma$-$Fe_2O_3$, $Fe_3O_4$, $FeO_x$ ($1.33<x<1.5$), an Fe metal fine powder, $CrO_2$, Co-modified $\gamma$-$Fe_2O_3$, Co-modified Ba-ferrite, Co-modified Sr-ferrite, etc. The ferromagnetic powder to be used in the present invention should have a specific surface area of not less than about 40 $m^2/g$. Prior to dispersion of the ferromagnetic powder, various additives hereinafter described, such as a dispersing agent, a lubricating agent, an antistatic agent, etc., may be adsorbed thereon. Adsorption on the ferromagnetic powder can be carried out by immersing the powder in a solution of the additive.

The binder for constructing a magnetic layer in which the ferromagnetic powder is uniformly dispersed includes conventionally known thermoplastic resins, thermosetting resins, reactive resins, and mixtures thereof.

The thermoplastic resins to be used have a softening point of about 150° C. or lower, an average molecular weight of from about 10,000 to about 300,000, and a degree of polymerization of from about 50 to about 1,000 and includes, for example, a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, a nylon-silicone resin, a nitrocellulose-polyamide resin, polyvinyl fluoride, a vinylidene chloride-acrylonitrile copolymer, a butadiene-acrylonitrile copolymer, a polyamide resin, polyvinyl butyral, a cellulose derivative (e.g., cellulose acetate butyrate, cellulose diacetate, cellulose triacetate, nitrocellulose, etc.), a styrene-butadiene copolymer, a polyester resin, chlorovinyl ether-acrylic ester copolymer, an amino resin, and various synthetic rubber thermoplastic resins, and mixtures thereof.

The thermosetting resin or reactive resin to be used has a molecular weight of about 200,000 or less at the time of coating and, after drying, undergoes a reaction, such as condensation, addition, and the like, upon heating to having an unlimited increase in molecular weight. Among these resins, preferred are those which are not softened or melted during the time up to thermal decomposition. Specific examples of such resins are a phenol resin, an epoxy resin, a curing polyurethane resin, a urea resin, a melamine resin, an alkyd resin, a silicone resin, a reactive acrylic resin, an epoxy-polyamide resin, a nitrocellulose melamine resin, a mixture of a high molecular polyester resin and an isocyanate prepolymer, a mixture of a methacrylate copolymer and a diisocyanate prepolymer, a mixture of a polyester polyol and a polyisocyanate, a urea formaldehyde resin, a mixture of a low molecular weight glycol, a high molecular weight diol, and triphenylmethane triisocyanate, a polyamine resin, and mixtures of these resins.

The binder which can be used in the present invention preferably is resins having a hydrophilic group, for example, a polyurethane resin having a $-COOM^1$ or $-SO_3M^1$ group, wherein $M^1$ represents a hydrogen atom or an alkali metal, e.g., sodium, potassium, lithium, etc.; a vinyl chloride resin having an $-SO_3M^1$, $-COOM^1$,

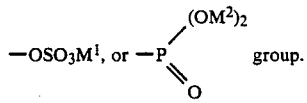

wherein $M^1$ is as defined above; and $M^2$ represents a hydrogen atom, an alkali metal (e.g., Li, Na, K, etc.), or a hydrocarbon group having from 11 to 20 carbon atoms; and a polyester resin having an $-SO_3M^1$ group, wherein $M^1$ is as defined above.

Details of these binder resins are described in Japanese patent application (OPI) Nos. 8127/84, 92422/82, 92423/82 and 40320/74.

Specific examples of the hydrophilic group-containing resins are "TIM-3005" (—COOH-containing polyurethane produced by Sanyo Kasei Co., Ltd.), "UR-8300" (—SO$_3$Na-containing polyurethane produced by Toyobo Co., Ltd.), "400—110A" (—COOH-containing vinyl chloride-vinyl acetate copolymer produced by Nippon Zeon Co., Ltd.), "Vylot 530" (—SO$_3$Na-containing polyester produced by Toyobo Co., Ltd.), and "MR—110" (—SO$_3$Na-containing vinyl chloride-vinyl acetate copolymer produced by Nippon Zeon Co., Ltd.). A preferred content of the hydrophilic group ranges generally from about 1 to 10,000 equivalents/10$^6$ gram and preferably from about 10 to 5,000 equivalents/10$^6$ gram. A preferred molecular weight of these resins is generally from about 10,000 to 20,000 and preferably from about 10,000 to 15,000.

The binder is used in an amount of from about 5 to 300 parts by weight and preferably from about 15 to 150 parts by weight, per 100 parts by weight of the ferromagnetic powder.

As mentioned above, a coating composition for a magnetic layer can be prepared by dissolving a desired binder in a solvent capable of dissolving it and adding a ferromagnetic powder thereto, followed by uniformly dispersing.

The solvent for dissolving the binder includes ketones, e.g., acetone, methyl ethyl ketone, methyl isobutyl ketone, cyclohexanone, isophorone, tetrahydrofuran, etc.; alcohols, e.g., methanol, ethanol, propanol, butanol, isobutyl alcohol, isopropyl alcohol, methylhexanol, etc.; eters, e.g., methyl acetate, ethyl acetate, butyl acetate, isobutyl acetate, isopropyl acetate, ethyl lactate, glycol acetate, etc.; monoethyl ether; diethyl ether; glycol ethers, e.g., glycol dimethyl ether, glycol monomethyl ether, dioxane, etc.; aromatic hydrocarbons, e.g., benzene, toluene, xylene, cresol, chlorobenzene, styrene, etc.; chlorinated hydrocarbons, e.g., methylene chloride, ethylene chloride, carbon tetrachloride, chloroform, ethylenechlorohydrin, dichlorobenzene, etc.; N,N-dimethylformamide; hexane; and so on.

The coating composition can further contain other additives, such as a dispersing agent, a lubricating agent, etc. The dispersing agent includes fatty acids having from 10 to 22 carbon atoms, e.g., caprylic acid, capric acid, lauric acid, myristic acid, palmitic acid, stearic acid, oleic acid, elaidic acid, linoleic acid, linolenic acid, stearolic acid, etc.; alkali or alkaline earth metal salts of these fatty acids or metallic soaps of these fatty acids with copper, lead, etc.; lecithin; and higher alcohols having 10 or more carbon atoms, or sulfuric esters or phosphoric esters of these higher alcohols. These dispersing agents are added in an amount of generally from about 0.05 to 20 parts by weight and preferably from about 0.1 to 10 parts by weight, per 100 parts by weight of the binder. The lubricant to be used includes silicone oil, graphite, molybdenum disulfide, boron nitride, fluorinated graphite, fluorinated alcohols, polyolefins, polyglycols, alkylphosphates, polyphenyl ethers, tungsten disulfide, higher fatty acid esters, higher fatty acid amides, and higher aliphatic alcohols. In addition, lubricating oil additives usually added to lubricating oils, such as antioxidants, e.g., alkyl phenols; rust preventing agents, e.g., naphthenic acid; oiliness improvers, e.g., lauryl alcohol; extreme pressure additives, e.g., dibenzyl sulfide; detergent dispersants; viscosity index improvers; flow point reducing agents; defoaming agents; and the like can also be added to the composition. These lubricating agents are added in an amount of generally from about 0.05 to 20 parts by weight and preferably from about 0.1 to 10 parts by weight, per 100 parts by weight of a binder. The antistatic agent to be used includes conductive powders, e.g., graphite, carbon black, carbon black graft polymers, etc.; natural surface active agents, e.g., saponin, etc.; and various nonionic, anionic, cationic or amphoteric surface active agents. These antistatic agents may be used either individually or in combinations of two or more thereof. Further, these compounds can be used not only as antistatic agents but for other purposes, such as improvement of dispersibility, magnetic characteristics, lubricating oiliness, and coating properties. These antistatic agents are added in an amount of preferably from 0.01 to 5 parts by weight per 100 parts by weight of a binder.

The magnetic recording medium according to the present invention has a magnetic layer of about 2 μm or less in dry thickness which is excellent in electromagnetic conversion characteristics in the shorter wavelength region. The present invention requires addition of ultrafine abrasive particles for the purpose of improving abrasion resistance and magnetic characteristics of the magnetic layer. The abrasive to be used in this invention is an ultrafine α—Al$_2$O$_3$ powder having a particle size of not greater than about 0.1 μm, and preferably from about 0.08 μm to about 0.03 μm. Specific examples of such an abrasive include "HIT-100" (manufactured by Sumitomo Chemical Co., Ltd.). In the method of this invention, addition of such an ultrafine α—Al$_2$O$_3$ powder should be effected by uniformly dispersing it in a dispersion medium and then adding the dispersion to the magnetic composition. The ultrafine α—Al$_2$O$_3$ powder is used in an amount of generally from about 50 to 120 parts by weight and preferably from about 70 to 110 parts by weight, per 100 parts by weight of the dispersion medium. The medium for dispersing the α—Al$_2$O$_3$ powder may be a solution of the above-described binder and a solvent thereof.

Since the magnetic layer of the magnetic recording medium of this invention has a very small thickness as described above, if an abrasive powder having a particle size of 0.3 μm or greater is directly incorporated into the magnetic composition, it is very liable to agglomerate in the composition, and the agglomerates of the abrasive powder would protrude on the surface of a magnetic layer, resulting not only in impairment of surface smoothness of the magnetic layer but also in serious wear of a magnetic head of a recording and reproduction device. Therefore, in the present invention, an ultrafine powder of the abrasive having a particle size of not greater than about 0.1 μm should be used, and such an ultrafine powder should be separately dispersed over a relatively long period of time to prepare an independent dispersion wherein the abrasive powder is completely dispersed, which is then added to a magnetic composition, whereby agglomeration during the preparation of the coating composition can be avoided.

The method for dispersion treatment is not particularly restricted. The order of adding various components, including the α—$Al_2O_3$ powder dispersion, can be selected appropriately. Apparatuses to be used for dispersing can appropriately be selected from among a two-roll mill, a three-roll mill, a ball mill, a pebble mill, a trommel, a sand grinder, an attritor, a high speed impeller, a dispersing machine, a high speed stone mill, a high speed impact mill, a disper, a kneader, a high speed mixer, a ribbon blender, cokneader, an intensive mixer, a tumbler, a blender, a disperser, a homogenizer, an ultrasonic dispersing machine, and the like.

The thus prepared magnetic coating composition is coated on a nonmagnetic support by various known coating techniques, such as air doctor coating, blade coating, air knife coating, squeeze coating, dip coating, reverse roll coating, transfer roll coating, gravure coating, kiss coating, cast coating, spray coating, and the like. The coated amount (coverage) should be about 2 μm or less in dry thickness thereby to decrease thickness loss of electromagnetic conversion characteristics. A particularly preferred dry thickness of the magnetic layer is 1.0 μm or less.

The support to be used includes plastic films made of polyesters (e.g., polyethylene terephthalate and polyethylene naphthalate), polyolefins (e.g., polypropylene), cellulose derivatives (e.g., cellulose triacetate and cellulose diacetate), vinyl resins (e.g., polyvinyl chloride), polycarbonate resins, polyamide resins, polysulfone, etc.; metallic sheets such as aluminum, copper, etc.; a glass plate; and ceramics. The support may previously be subjected to surface treatment, such as corona discharge, plasma treatment, subbing treatment, heat treatment, metal deposition, alkali treatment, and the like. The shape of the support is not limited.

The magnetic layer coated on the support is generally subjected to orientation in a magnetic field before completion of drying to orient the ferromagnetic powder in the layer. The coating, drying, and orientation in a magnetic field can be carried out by proper application of known techniques. If desired, a backing layer may be provided on the back side of the support. The resulting coated material may be cut into any desired shape.

With respect to materials and processes for producing the materials which can be applied to the present invention other than those described above, a description is found in Japanese patent publication No. 26890/81.

The present invention is now illustrated in greater detail with reference to the following Examples and Comparative Examples, but the present invention is not to be construed as being limited thereto. In these examples, all the parts, ratios and percents are by weight unless otherwise indicated.

EXAMPLE 1 AND COMPARATIVE EXAMPLE 1

An α—$Al_2O_3$ powder having a varied particle size as shown in Table 1 was added to a composition containing a vinyl chloride-vinyl acetate copolymer, a urethane resin, and methyl ethyl ketone, and the mixture was dispersed in a sand grinder for 10 hours to prepare a uniform dispersion of the α—$Al_2O_3$ powder.

A uniform magnetic composition having the following formulation was prepared by dispersion in the same manner as described above. In the course of dispersion, the above prepared α—$Al_2O_3$ powder dispersion was added to the system, and the dispersing was continued to prepare a uniform coating composition.

| Magnetic Composition Formulation: | parts |
|---|---|
| Ferromagnetic Fe—Ni alloy (Ni: about 5 wt %; specific surface area: 45 $m^2/g$) | 100 |
| Vinyl chloride-vinyl acetate-maleic anhydride copolymer ("400X110A", produced by Nippon Zeon Co., Ltd.) | 12 |
| Urethane resin ("N-2301", produced by Nippon Polyurethane Co., Ltd.) | 12 |
| Polyisocyanate ("Colonate L", produced by Nippon Polyurethane Co., Ltd.) | 8 |
| Carbon black (average particle size: 0.04 μm) | 2 |
| α-$Al_2O_3$ powder dispersion | 10 |
| Methyl ethyl ketone | 150 |

The resulting coating composition was coated on a 10 μm thick polyethylene terephthalate film to obtain a magnetic layer having a dry thickness of 2.0 μm, followed by drying. The coating film, while not yet completely dried, was subjected to orientation in a magnetic field. After completion of the drying, the magnetic layer thus formed on the support was subjected to calendering and then cut to a width of ½ inch to prepare a VHS video tape. The resulting tapes were designated as Samples 1 to 6.

COMPARATIVE EXAMPLE 2

VHS video tapes were prepared in the same manner as in Example 1 and Comparative Example 1, except that only α—$Al_2O_3$ powders (not in the form of a dispersion) were directly used in place of the α—$Al_2O_3$ powder dispersion. The resulting tapes were designated as Samples 7 to 10, respectively.

COMPARATIVE EXAMPLE 3

A VHS video tape was prepared in the same manner as in Example 1, except for replacing the α—$Al_2O_3$ powder with a $CaCO_3$ powder. The resulting tape was designated as Sample 11.

Each of Samples 1 to 11 was evaluated for various performance properties according to the following test methods. The results obtained are shown in Table 1.

(1) Electromagnetic Conversion Characteristics

Each sample was run on a VHS video tape recorder, and the C/N ratio (ratio of noise to reproduction RF output) was measured. The result obtained was relatively expressed by taking the C/N ratio of "Super XG-T-120" (a VHS video tape produced by Fuji Photo Film Co., Ltd.) as 0 dB.

(2) Dropout (D.O.) Number

Each sample was run on a VHS video tape recorder. After 100 runs, the number of dropouts at 15 microseconds and −20 dB per minute was measured by the use of a dropout counter "VDV-3D" manufactured by Victor Company of Japan, Ltd.

(3) Wear of Magnetic Head

Each sample (before use) was run on a VHS video tape recorder. After 100 runs, the wear (μm) of the magnetic head was measured.

TABLE 1

| Example No. | Sample No. | Abrasive (particle size: μm) | | Electromagnetic Conversion Characteristics C/N | D.O. Number | Wear of Magnetic Head (μm) |
|---|---|---|---|---|---|---|
| Example 1 | 1 | Dispersion of α-Al$_2$O$_3$ powder | (0.03) | +5.8 | 20 | 6 |
| Example 1 | 2 | Dispersion of α-Al$_2$O$_3$ powder | (0.06) | +5.5 | 15 | 8 |
| Example 1 | 3 | Dispersion of α-Al$_2$O$_3$ powder | (0.10) | +5.2 | 10 | 10 |
| Comparative Example 1 | 4 | Dispersion of α-Al$_2$O$_3$ powder | (0.30) | +2.5 | 15 | 15 |
| Comparative Example 1 | 5 | Dispersion of α-Al$_2$O$_3$ powder | (0.50) | +2.1 | 15 | 20 |
| Comparative Example 1 | 6 | Dispersion of α-Al$_2$O$_3$ powder | (1.0) | +0.5 | 20 | 30 |
| Comparative Example 2 | 7 | α-Al$_2$O$_3$ powder | (0.03) | +3.1 | 50 | 8 |
| Comparative Example 2 | 8 | α-Al$_2$O$_3$ powder | (0.06) | +3.7 | 35 | 12 |
| Comparative Example 2 | 9 | α-Al$_2$O$_3$ powder | (0.1) | +3.2 | 25 | 15 |
| Comparative Example 2 | 10 | α-Al$_2$O$_3$ powder | (0.5) | +1.5 | 15 | 25 |
| Comparative Example 3 | 11 | Dispersion of CaCO$_3$ | (0.05) | +0.5 | 100 or more | 1 |

EXAMPLE 2

An α—Al$_2$O$_3$ powder dispersion was prepared in the same manner as in Example 1.

A magnetic coating composition having the following formulation was prepared in the same manner as in Example 1.

| Magnetic Composition Formulation: | parts |
|---|---|
| Ferromagnetic Co-containing γ-iron oxide (crystal size: 200–400Å) | 300 |
| Sulfo group-containing vinyl chloride copolymer | 30 |
| Urethane resin | 20 |
| Polyisocyanate | 10 |
| Lecithin | 3 |
| Lauric acid | 3 |
| Oleic acid | 3 |
| Butyl acetate | 106 |
| Methyl ethyl ketone | 150 |
| α-Al$_2$O$_3$ powder dispersion | 15 |

A VHS video tape was prepared in the same manner as in Example 1, except for using the above-prepared coating composition. The resulting tape was designed as Sample 12.

COMPARATIVE EXAMPLE 4

A VHS video tape was prepared in the same manner as in Example 2, except that the α—Al$_2$O$_3$ powders having different particle size and not being in the form of dispersion were directly used in place of the αAl$_2$O$_3$ powder dispersion. The resulting tape was designated as Sample 13.

EXAMPLE 3

An α—Al$_2$O$_3$ powder dispersion was prepared in the same manner as in Example 1.

A magnetic coating composition having the following formulation was prepared in the same manner as in Example 1. In the course of dispersion, the above-prepared α—Al$_2$O$_3$ powder dispersion was added to the system, and the dispersing was continued to prepare a uniform coaing composition.

| Magnetic Composition Formulation: | parts |
|---|---|
| Ferromagnetic Co-containing γ-iron oxide (crystal size 200–400 Å) | 300 |
| $-P\begin{smallmatrix}(OH^2)_2\\\\O\end{smallmatrix}$ -containing vinyl chloride- vinyl acetate copolymer | 30 |
| Urethane resin | 20 |
| Polyisocyanate | 10 |
| Lecithin | 3 |
| Oleic acid | 3 |
| Butyl acetate | 106 |
| Methyl ethyl ketone | 150 |
| α-Al$_2$O$_3$ powder dispersion | 15 |

A VHS video tape was prepared in the same manner as in Example 1, except for using the above-prepared coating composition. The resulting tape was designated as Sample 14.

Each of Samples 12, 13 and 14 was evaluated in the same manner as for Samples 1 to 11, and the results obtained are shown in Table 2.

TABLE 2

| Example No. | Sample No. | Abrasive (particle size: μm) | | Electromagnetic Conversion Characteristics C/N | D.O. Number | Wear of Magnetic Head (μm) |
| --- | --- | --- | --- | --- | --- | --- |
| Example 2 | 12 | Dispersion of α-Al₂O₃ powder | (0.06) | +4.5 | 10 | 8 |
| Comparative Example 4 | 13 | α-Al₂O₃ powder | (0.06) | +3.0 | 28 | 15 |
| Example 3 | 14 | Dispersion of α-Al₂O₃ powder | (0.06) | +4.0 | 5 | 5 |

As is apparent from the results of Tables 1 and 2, the magnetic recording media according to the present invention (Examples 1, 2 and 3; i.e., Samples 1 to 3, 12 and 14) exhibited excellent electromagnetic characteristics and decreased the wear of the magnetic head. To the contrary, the comparative tapes prepared in Comparative Examples 1 and 4 (Samples 4 to 6 and 13) had low electromagnetic characteristics and seriously wore the magnetic head through repeated running. Samples 7 to 10 prepared in Comparative Example 2 had low electromagnetic characteristics and suffered serious dropouts. Although Sample 11 of Comparative Example 3 reduced wear of the magnetic head, it was unsuitable for practical use due to significantly low electromagnetic characteristics and large dropouts.

According to the present invention, sufficient uniformity of a magnetic coating composition can be assured while avoiding agglomeration by using an ultrafine abrasive powder having a particle size of not greater than about 0.1 μm and preparing a dispersion of the abrasive separately from other components. A magnetic recording layer formed by such a uniform coating composition is excellent in smoothness and surface properties as well as uniform dispersibility. Therefore, the magnetic recording medium prepared according to the present invention possesses various superior performance properties, such as excellent electromagnetic characteristics, reduced dropout numbers, and decreased wear of a magnetic head of a video tape recorder, in spite of the fact that the magnetic recording layer thereof is thinner than that of conventional magnetic recording media. Thus, the present invention is of great advantage in that excellent magnetic recording media for high density recording can be produced.

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording medium which comprises uniformly dispersing an α—Al₂O₃ powder having a particle size of not greater than 0.1 μm in a dispersion medium to obtain a dispersion, adding the dispersion to a coating composition for a magnetic layer essentially comprising a binder and a ferromagnetic powder having a specific surface area of not less than about 40 m²/g, further dispersing the mixture to prepare a coating composition for a magnetic layer, and then coating the resulting coating composition on a nonmagnetic support to obtain a magnetic layer having a dry thickness of about 2 μm or less.

2. The process as claimed in claim 1, wherein said α—Al₂O₃ powder has a particle size of from about 0.08 to about 0.03 μm.

3. The process as claimed in claim 1, wherein said coating composition is coated to a dry thickness of 1.0 μm or less.

4. The process as claimed in claim 1, wherein the binder is a resin having a hydrophilic group selected from the group consisting of a polyurethane resin having —COOM¹ or —SO₃M¹, wherein M¹ represents a hydrogen atom or an alkali metal; a vinyl chloride resin having an —SO₃M¹, —COOM¹, —OSO₃M¹ or

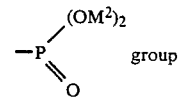

group wherein M¹ represents a hydrogen atom or an alkali metal and M² represents a hydrogen atom, an alkali metal, or a hydrocarbon group; and a polyester resin having —SO₃M¹, wherein M¹ represents a hydrogen atom or an alkali metal.

5. The process as claimed in claim 4, wherein the binder is the vinyl chloride resin having a

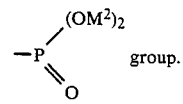

group.

6. The process as claimed in claim 4, wherein the content of the hydrophilic group ranges from 1 to 10,000 equivalents per 1×10⁶ gram of the binder.

7. The process as claimed in claim 1, wherein the coating composition comprises from 5 to 300 parts by weight of the binder per 100 parts by weight of the ferromagnetic powder.

8. The process as claimed in claim 1, wherein the dispersion medium comprises the binder composed of a resin having a hydrophilic group consisting of a polyurethane resin having —COOM¹ or —SO₃M¹, wherein M¹ represents a hydrogen atom or an alkali metal; a vinyl chloride resin having an —SO₃M¹, —COOM¹, —OSO₃M¹, or

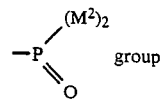

group wherein M¹ represents a hydrogen atom or an alkali metal and M² represents a hydrogen atom, an alkali metal, or a hydrocarbon group; and a polyester resin having —SO₃M¹, wherein M¹ represents a hydrogen atom or an alkali metal, and solvents.

9. The process as claimed in claim 8, wherein the binder is the vinyl chloride resin having a

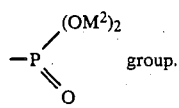 group.
10. The process as claimed in claim 1, wherein α—Al$_2$O$_3$ is dispersed in an amount of from 50 to 120 parts by weight per 100 parts by weight of the dispersion medium.
* * * * *